(12) United States Patent
Kodialam et al.

(10) Patent No.: US 7,558,209 B2
(45) Date of Patent: Jul. 7, 2009

(54) MAXIMUM-THROUGHPUT ROUTING OF TRAFFIC IN THE HOSE MODEL

(75) Inventors: Muralidharan S. Kodialam, Marlboro, NJ (US); Tirunell V. Lakshman, Morganville, NJ (US); Sudipta Sengupta, Malden, MA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 480 days.

(21) Appl. No.: 11/414,147

(22) Filed: Apr. 28, 2006

(65) Prior Publication Data

US 2007/0253403 A1    Nov. 1, 2007

(51) Int. Cl.
  *G01R 31/08*   (2006.01)
  *H04L 12/28*   (2006.01)
(52) U.S. Cl. ........................................ 370/238; 370/255
(58) Field of Classification Search .................. None
  See application file for complete search history.

(56) References Cited

U.S. PATENT DOCUMENTS

| | | | | |
|---|---|---|---|---|
| 5,666,360 | A | * | 9/1997 | Chen et al. .................. 370/390 |
| 6,098,107 | A | * | 8/2000 | Narvaez-Guarnieri et al. .......................... 709/239 |
| 7,388,842 | B1 | * | 6/2008 | Applegate et al. ........... 370/238 |

* cited by examiner

*Primary Examiner*—Wing F Chan
*Assistant Examiner*—Eunsook Choi

(57) ABSTRACT

A computer-implemented method of computing throughput of a data-routing scheme for a network of nodes interconnected by links and having at least one ingress point and at least one egress point. The method includes: deriving a polynomial-size linear program from a combination of a first linear program and a second linear program and solving the polynomial-size linear program. The first linear program has infinite constraints and minimizes maximum-link utilization of a link in a path between the ingress point and the egress point. The second linear program determines whether any constraint of the first linear program is violated.

19 Claims, 2 Drawing Sheets

| Topology | Routers (original) | Links (inter-router) | PoPs (coalesced) | Links (inter-Pop) |
|---|---|---|---|---|
| Telstra (Australia) 1221 | 108 | 306 | 57 | 59 |
| Sprintlink (US) 1239 | 315 | 1944 | 44 | 83 |
| Ebone (Europe) 1755 | 87 | 322 | 23 | 38 |
| Tiscali (Europe) 3257 | 161 | 656 | 50 | 88 |
| Exodus (Europe) 3967 | 79 | 294 | 22 | 37 |
| Abovenet (US) 6461 | 141 | 748 | 22 | 42 |

TABLE I

FIG. 4

| Topology | Lower bound on $\lambda_{TPR}/\lambda_{OPT}$ |
|---|---|
| Telstra (Australia) 1221 | 100% |
| Sprintlink (US) 1239 | 97.71% |
| Ebone (Europe) 1755 | 98.90% |
| Tiscali (Europe) 3257 | 95.65% |
| Exodus (Europe) 3967 | 100% |
| Abovenet (US) 6461 | 94.82% |

TABLE II

FIG. 5

MAXIMUM-THROUGHPUT ROUTING OF TRAFFIC IN THE HOSE MODEL

BACKGROUND OF THE INVENTION

1. Field of the Invention

The present invention relates, generally, to network routing schemes, and more particularly, to the provisioning of networks so as to achieve robustness to traffic variation.

2. Description of the Related Art

With the rapid rise in new Internet-based applications, such as peer-to-peer and voice-over-IP (Internet Protocol), the accommodation of widely-varying traffic patterns in networks has become increasingly important. Accordingly, it has also become increasingly important for Internet Service Providers (ISPs) to accurately monitor traffic and to deploy mechanisms for adapting network routing to changing traffic patterns. This dynamic adaptation increases the complexity of network operations. To avoid this complexity, service providers should provision their networks such that the provisioning is robust to large changes in traffic patterns. One model to enable such provisioning is known as the "hose-traffic model" or "hose model," which is described in N. G. Duffield et al., "A flexible model for resource management in virtual private network," *ACM SIGCOMM* 1999, August 1999, incorporated herein by reference. In the hose model, the assumption is that there is knowledge regarding the maximum traffic entering and leaving the network at each node, but no knowledge of the actual traffic matrix itself. Several algorithms for routing traffic in the hose model have recently been proposed by Duffield and others, including T. Erlebach et al., "Optimal Bandwidth Reservation in Hose-Model VPNs with Multi-Path Routing," *IEEE Infocom* 2004, March 2004, and A. Kumar et al., "Algorithms for provisioning VPNs in the hose model," *ACM SIGCOMM* 2001, August 2001, both incorporated herein by reference. These schemes route traffic directly from source nodes to destination nodes along fixed paths.

A recently proposed approach is two-phase routing, as described in M. Kodialam et al., "Efficient and Robust Routing of Highly Variable Traffic," *Third Workshop on Hot Topics in Networks (HotNets-III)*, November 2004, and R. Zhang-Shen et al., "Designing a Predictable Internet Backbone Network," *Third Workshop on Hot Topics in Network (HotNets-III)*, November 2004, both incorporated herein by reference. In the first phase of a two-phase routing scheme, incoming traffic is sent from the source to a set of intermediate nodes in predetermined proportions. In the second phase, incoming traffic is routed from the intermediate nodes to the final destination. The proportion of traffic that is distributed to each intermediate node in the first phase can depend on the intermediate nodes.

The two-phase routing scheme is flexible because it can handle wide traffic variations and is useful for various networking applications, such as service overlays with bandwidth guarantees, virtual private networks, routing through middleboxes (intermediate devices performing functions other than the normal, standard functions of an IP router on a datagram path between a source host and a destination host) for security, and IP-over-optical networks with a statically-configured transport layer.

For the IP-over-optical network application, because of static provisioning at the optical layer, neither the paths nor their associated bandwidths change with shifts in traffic. Two-phase routing meets these criteria, while direct source-destination-path routing does not. An important innovation of the two-phase routing scheme is the handling of traffic variability in a capacity-efficient manner through static preconfiguration of the network and without requiring either (i) measurement of traffic in real-time or (ii) reconfiguration of the network in response to changes in traffic.

SUMMARY OF THE INVENTION

In one embodiment, the present invention provides a computer-implemented method of computing throughput of a data-routing scheme for a network of nodes interconnected by links and having at least one ingress point and at least one egress point. The method comprises deriving a polynomial-size linear program from a combination of a first linear program and a second linear program and solving the polynomial-size linear program. The first linear program has infinite constraints and minimizes maximum-link utilization of a link in a path between the ingress point and the egress point, and the second linear program determines whether any constraint of the first linear program is violated.

In another embodiment, the present invention provides an apparatus for computing throughput of a data-routing scheme for a network of nodes interconnected by links and having at least one ingress point and at least one egress point. The apparatus comprises means for deriving a polynomial-size linear program from a combination of a first linear program and a second linear program and means for solving the polynomial-size linear program. The first linear program has infinite constraints and minimizes maximum-link utilization of a link in a path between the ingress point and the egress point, and the second linear program determines whether any constraint of the first linear program is violated.

In a further embodiment, the present invention provides a computer-readable medium having stored thereon a plurality of instructions, the plurality of instructions including instructions which, when executed by a processor, cause the processor to implement a method of computing throughput of a data-routing scheme for a network of nodes interconnected by links and having at least one ingress point and at least one egress point. The method comprises deriving a polynomial-size linear program from a combination of a first linear program and a second linear program and solving the polynomial-size linear program. The first linear program has infinite constraints and minimizes maximum-link utilization of a link in a path between the ingress point and the egress point, and the second linear program determines whether any constraint of the first linear program is violated.

BRIEF DESCRIPTION OF THE DRAWINGS

FIG. 4 is a table providing the original number of routers and inter-router links and number of coalesced points-of-presence (PoPs) and inter-PoP links for Rocketfuel topologies used in connection with experiments by the inventors hereof; and FIG. 5 is a table providing the closeness of throughput of two-phase routing to that of the optimal scheme for the Rocketfuel topologies.

DETAILED DESCRIPTION

Figure 1:
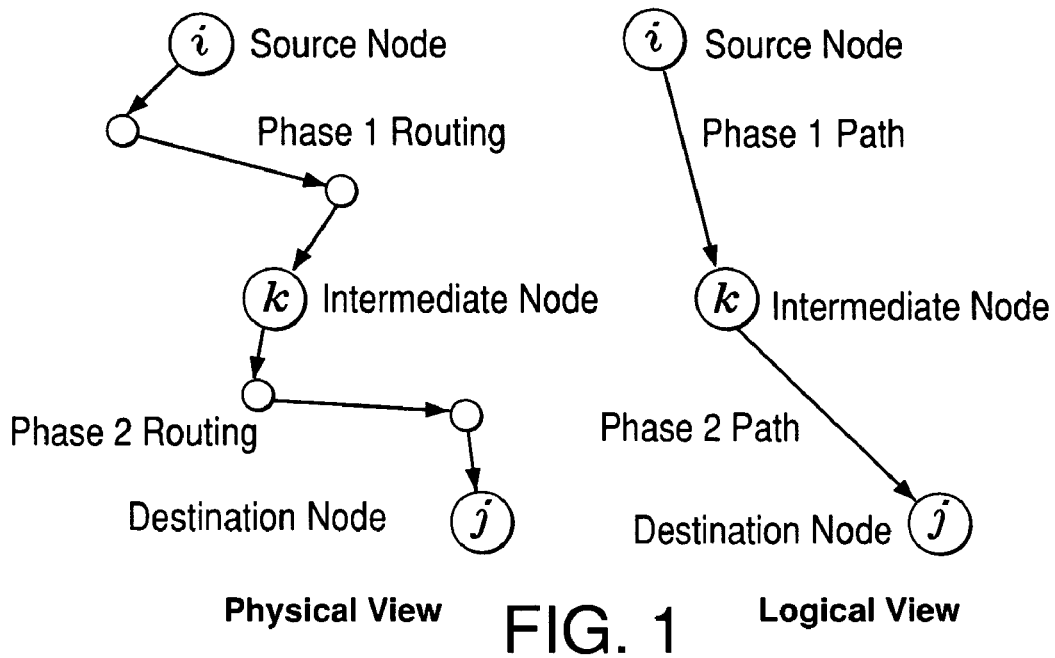
FIG. 1 is a diagram of physical and logical views of a two-phase routing scheme consistent with one embodiment of the present invention.

The present invention, in various embodiments, originates from an investigation to determine whether the desirable properties of two-phase routing also involve incurring any resource overhead as compared to (i) direct source-destination-path routing and (ii) an optimal routing scheme among the class of all routing schemes that are allowed to reconfigure the routing so as to be dynamically dependent on the traffic matrix. The foregoing determination is addressed herein by first developing the first polynomial-size linear-programming (LP) formulation for maximum-throughput routing of hose traffic along direct source-destination paths. Second, the first polynomial-size LP formulation for maximum-throughput two-phase routing of hose traffic is developed for a generalized version of the scheme proposed in M. Kodialam et al., cited hereinabove. Third, it is proven that the throughput of two-phase routing is at least half that of an optimal scheme. Using the polynomial-size LP formulations developed, the throughput of two-phase routing is compared with that of direct source-destination-path routing on actual ISP topologies. Quite surprisingly, the inventors hereof have discovered that the throughput of two-phase routing matches that of direct source-destination-path routing and is within 6% of an optimal scheme on all evaluated topologies. This discovery dispels previous concerns that two-phase routing achieves its robustness to traffic variation through substantial overprovisioning of capacity. It is believed that the establishment of the capacity efficiency of two-phase routing will influence and shape the mindset of ISPs in considering the deployment of two-phase routing in their networks.

The underlying network model and the definitions and terminology used herein will first be explained. In a network $G=(N,E)$ with node set N and (directed) edge set E, each node in the network can be a source or destination of traffic. Using pairs of vertical bars to symbolize the cardinality of a set, $|N|=n$ and $|E|=m$. The nodes in N are labeled $\{1,2,\ldots,n\}$. The sets of incoming and outgoing edges at node i are denoted by $E^-(i)$ and $E^+(i)$, respectively. The expression (i,j), also referred to as simply e, represents a directed link in the network from node i to node j. The capacity of link (i,j) is denoted by $u_{ij}$. The utilization of a link is defined as the maximum traffic usage on the link divided by its capacity.

Certain embodiments of the present invention consider a traffic variation model, wherein the total amount of traffic that enters an ingress node is bounded by the total capacity of all external ingress links at that node, and the total amount of traffic that leaves an egress node is bounded by the total capacity of all external egress links at that node. This is known as the hose model, as proposed by J. A. Fingerhut et al, "Designing Least-Cost Nonblocking Broadband Networks," *Journal of Algorithms*, 24(2), pp. 287-309, 1997, incorporated herein by reference, and subsequently used by N. G. Duffield et al., cited hereinabove, as a method for specifying the bandwidth requirements of a Virtual Private Network (VPN). It is noted that the hose model naturally accommodates the network's ingress-egress capacity constraints.

The upper bounds on the total amount of traffic entering and leaving the network at node i is denoted by $R_i$ and $C_i$, respectively. The point-to-point matrix for the traffic in the network is thus constrained by these ingress-egress link capacity bounds. These constraints might be the only known aspects of the traffic to be carried by the network, and knowing these is equivalent to knowing the row and column sum bounds on the traffic matrix. These row and column sum bounds correspond to the network's ingress and egress capacities, i.e., the total traffic that can enter or leave the network at each border router, wherein the maximum possible row sum indicates the maximum possible outgoing traffic, and the maximum possible column sum indicates the maximum possible incoming traffic. Accordingly, any allowable traffic matrix $T=[t_{ij}]$ for the network obeys the following inequalities, where T is a matrix with the (i,j)th entry $t_{ij}$ representing the traffic from node i to node j:

$$\sum_{j \in N, j \neq i} t_{ij} \leq R_i, \quad \sum_{j \in N, j \neq i} t_{ji} \leq C_j \forall \, i \in N.$$

For given $R_i$ and $C_j$ values, the set $T(\vec{R},\vec{C})$ of all such matrices that are partially specified by their row and column sums may be denoted by the following equation:

$$\mathcal{T}(\vec{R}, \vec{C}) = \left\{ [t_{ij}] \,\bigg|\, \sum_{j \neq i} t_{ij} = R_i \text{ and } \sum_{j \neq i} t_{ji} = C_j \forall \, i \right\}.$$

It should be noted that the traffic distribution T could be any matrix in $T(\vec{R},\vec{C})$ and could change over time. The expression $\lambda \cdot T(\vec{R},\vec{C})$ denotes the set of all traffic matrices in $T(\vec{R},\vec{C})$, with their entries multiplied by $\lambda$.

Direct Source-Destination Routing Along Fixed Paths

Direct routing from source to destination (instead of in two phases) along fixed paths for the hose-traffic model has been considered by N. Duffield et al. and Kumar et al., both cited hereinabove. In order to make throughput comparisons with two-phase routing, a multi-path version of direct source-destination routing is considered, in which traffic from a source to a destination can be split along multiple paths, and both the paths and the ratios in which traffic is split among them are fixed a priori. An instance of this scheme is completely described by specifying how a unit flow is (splittably) routed between each source-destination pair in the network.

In related work, Y. Azar et al., "Optimal oblivious routing in polynomial time", 35*th ACM Symposium on the Theory of Computing (STOC)*, 2003, incorporated herein by reference, consider direct source-destination-path routing and describe how to compute relative guarantees for routing an arbitrary traffic matrix with respect to the best routing for that matrix. However, there is no provision of absolute-bandwidth guarantees for routing variable traffic under the hose model.

T. Erlebach et al., cited hereinabove, consider the problem of minimum-cost direct source-destination-(multi-)path routing of hose traffic under given link costs (and link capacities). An LP with an infinite number of constraints and a polynomial-size separation-oracle LP are provided that are suitable for solving using the ellipsoid method, as described by Schrijver et al., *Theory of linear and Integer Programming*, John Wiley & Sons, 1986, incorporated herein by reference. The ellipsoid method is primarily a theoretical tool for proving polynomial-time solvability, and its running time is not feasible for practical implementations. T. Erlebach et al. also disclose a cutting-plane heuristic for solving the infinite-size LP and obtain reasonable running times for the experiments reported. However, this cutting-plane heuristic can, in the worst case, have exponential running times.

The inventors disclose herein the first polynomial-size LP for maximum-throughput multipath routing of hose traffic under given link capacities. This technique can be used to obtain a polynomial-size LP for the minimum-cost version of the problem, as well.

Given a network with link capacities $u_e$ and constraints $R_i, C_j$ on the ingress-egress traffic, the problem of direct source-destination-path routing so as to maximize the network throughput is considered. The throughput is the maximum multiplier $\lambda$, such that all matrices in $\lambda \cdot T(\vec{R}, \vec{C})$ can be feasibly routed under given link capacities. The problem begins with an LP formulation having an infinite number of constraints and a corresponding polynomial-size separation-oracle LP. Then, the two LPs are combined into a polynomial-size LP that can be solved in polynomial time using a general linear-programming algorithm, e.g., as described in A. Schrijver, cited hereinabove.

Each LP has primal and dual problems and solutions that may be characterized as follows:

1. If the primal problem has a variables and b resource constraints, then the dual problem will have b variables and a resource constraints, where the constraint matrix of the dual problem is the transpose of the constraint matrix of the primal problem.

2. There is a one-to-one correspondence between the primal constraints and the dual variables, i.e., a variable in the dual problem is paired with an inequality in the primal problem, and similarly for the primal variables and the dual constraints.

3. The objective function of the dual problem is determined by the right-hand side of the primal constraints, and similarly for the objective function of the primal problem and the right-hand side of the dual constraints.

The fixed-path routing for each source-destination pair (i,j) can be specified by a set of unit-flow variables $f_e^{ij}$, where $f_e^{ij}$ denotes the fraction of traffic from i to j that traverses link e in the network. The maximum utilization of any link in the network is denoted by $\mu$. Maximizing the throughput is equivalent to minimizing the maximum-link utilization $\mu$, i.e., the reciprocal of the maximum-link utilization $\mu$, also known as throughput, is used herein as the optimization metric. This is a commonly used metric in the literature, since it is directly related to other metrics, such as link congestion. The exemplary linear program with infinite constraints is formulated with the constraints of equation (1) and inequalities (2) and (3), as follows:

$$\text{minimize } \mu,$$
$$\text{subject to}$$

$$\sum_{e \in E^+(k)} f_e^{ij} - \sum_{e \in E^-(k)} f_e^{ij} = \begin{cases} +1 & \text{if } k = i \\ -1 & \text{if } k = j, \\ 0 & \text{otherwise} \end{cases} \forall i, j, k \in N, \quad (1)$$

$$\sum_{i,j \in N} t_{ij} f_e^{ij} \leq \mu u_e \forall e \in E, \forall [t_{ij}] \in \mathcal{T}(\vec{R}, \vec{C}), \quad (2)$$

$$f_e^{ij} \geq 0 \forall e \in E, \forall i, j \in N. \quad (3)$$

The constraints of equation (1) correspond to the routing of unit flows between each source-destination pair for determining the fixed paths. The constraints of inequality (2) are the maximum utilization constraints for each link. The quantities $t_{ij}$ in the left-hand side of inequality (2) are constants, and hence, the constraints are linear. It is noted that there is an infinite set of constraints in inequality (2), since there are m constraints for each $[t_{ij}] \in T(\vec{R}, \vec{C})$.

The above LP can be solved in polynomial time by the ellipsoid algorithm, as described in Schrijver, cited hereinabove, provided that a polynomial-time separation oracle for the constraints of inequality (2) can be found. Given a set of values for the variables in the above LP, the separation oracle should identify at least one constraint that is violated (if any), or indicate otherwise. Clearly, the constraints of equation (1) can be verified in polynomial time.

To determine if the constraints in equation (1) are violated for any link, either a link e and a traffic matrix $[t_{ij}] \in T(\vec{R}, \vec{C})$ should be identified such that the corresponding constraint is violated, or it should be determined that all such constraints are satisfied. This can be done by verifying that for each link $l \in E$, the following LP, with variables $t_{ij} \forall i,j \in N$, has an optimum objective-function value of at most $\mu$. If not, the traffic matrix $[t_{ij}]$ obtained in an optimal solution of the LP identifies the corresponding violating constraint in inequality (2). The exemplary linear program is formulated as follows, with the constraints of inequalities (4), (5), and (6):

$$\text{maximize } \sum_{i,j \in N} f_\ell^{ij} t_{ij} / \mu_\ell,$$
$$\text{subject to}$$

$$\sum_{j \in N, j \neq i} t_{ij} \leq R_i \forall i \in N, \quad (4)$$

$$\sum_{i \in N, i \neq j} t_{ij} \leq C_j \forall j \in N, \quad (5)$$

$$t_{ij} \geq 0 \forall i, j \in N. \quad (6)$$

Linear programs such as the foregoing (and all other linear programs described herein) may be directly fed to an LP solver, such as ILOG CPLEX (http://www.ilog.com), to obtain a solution.

To develop the polynomial-size LP, the dual of the separation-oracle LP above is first considered. For a given link l, the dual LP has non-negative variables r(i,l) corresponding to each constraint in inequality (4) and non-negative variables c(j,l) corresponding to each constraint in inequality (5). The exemplary dual linear program is formulated with the constraints of inequalities (7) and (8), as follows:

$$\text{minimize } \sum_{i \in N} R_i r(i, l) + \sum_{j \in N} C_j c(j, l),$$
$$\text{subject to}$$

$$r(i, l) + c(j, l) \geq f_l^{ij} / u_l \forall i, j \in N, \quad (7)$$

$$r(i, l) + c(j, l) \geq 0 \forall i \in N. \quad (8)$$

It follows directly from strong duality of linear programming that, for each link $l \in E$, the primal (separation-oracle) LP has an optimum objective-function value of at most $\mu$, if and only if the dual LP has a feasible solution with an objective-function value of at most $\mu$. The requirement that the dual LPs, for all $l \in E$, have feasible solutions with an objective-function value of at most $\mu$, can be modeled as the following constraint:

$$\sum_{i \in N} R_i r(i, l) + \sum_{j \in N} C_j c(j, l) \leq \mu \forall l \in E.$$

This permits removal of the infinite set of constraints in inequality (2) and addition of the above constraint and the constraints of inequalities (7) and (8) from the dual LPs to obtain the following polynomial-size LP, which is formulated with the constraints of equation (9) and inequalities (10)-(13):

minimize $\mu$,
subject to $$\sum_{e \in E^+(k)} f_e^{ij} - \sum_{e \in E^-(k)} f_e^{ij} = \begin{cases} +1 & \text{if } k = i \\ -1 & \text{if } k = j, \\ 0 & \text{otherwise} \end{cases} \forall i, j, k \in N, \quad (9)$$

$$r(i, l) + c(j, l) \geq f_l^{ij}/u_l \forall l \in E, \forall i, j \in N, \quad (10)$$

$$\sum_{i \in N} R_i r(i, l) + \sum_{j \in N} C_j c(j, l) \leq \mu \forall l \in E, \quad (11)$$

$$r(i, l) + c(j, l) \geq 0 \forall i \in N, \forall l \in E, \quad (12)$$

$$f_e^{ij} \geq 0 \forall e \in E, \forall i, j \in N. \quad (13)$$

The foregoing LP has $n^2(n-1)$ constraints in equation (9), $mn(n-1)$ constraints in inequality (10), m constraints in inequality (11), $2mn$ constraints in inequality (12), and $mn(n-1)$ constraints in inequality (13), for a total of $O(mn^2)$ constraints. The number of variables is $mn(n-1)+2mn+1=O(mn^2)$.

Two-Phase Routing

An overview of two-phase routing will now be provided, after which the traffic-split ratios will be generalized so as to depend on source and destination nodes, as described in M. Kodialam, cited hereinabove. A polynomial-size LP for maximum-throughput two-phase routing (with generalized traffic-split ratios) of hose traffic under given link capacities will then be developed, which will serve to compare the resource requirements of two-phase routing with that of direct source-destination-path routing of hose traffic.

A two-phase routing scheme does not require the network to detect changes in the traffic distribution or to reconfigure the network in response to such changes. The only assumptions about the traffic that are made are the limits imposed by the ingress-egress constraints at each node. With reference now to FIG. 1, the two phases of the routing scheme are graphically illustrated. In phase 1, a predetermined fraction $\alpha_j$ of the traffic entering the network at any node is distributed to every node j, independent of the final destination of the traffic. In phase 2, as a result of the routing in phase 1, each node receives traffic destined for different destinations and routes the traffic to its respective destinations. It is noted that the traffic-split ratios $\alpha_1, \alpha_2, \ldots, \alpha_n$ in phase 1 of the scheme are such that $\Sigma_{i=1}^n \alpha_i = 1$. A simple method of implementing this routing scheme in the network is to form fixed-bandwidth paths between the nodes. In order to differentiate between the paths carrying phase-1 and phase-2 traffic, these paths are referred to herein as "phase-1 paths" and "phase-2 paths," respectively. The reason the two-phase routing strategy works is that the bandwidth required for these tunnels depends on the ingress-egress capacities $R_i C_j$ and the traffic-split ratios $\alpha_j$, but not on the (unknown) individual entries in the traffic matrix. Depending on the underlying routing architecture, the phase-1 and phase-2 paths can be implemented as IP tunnels, optical-layer circuits, or Label-Switched Paths (LSPs) in Multi-Protocol Label Switching (MPLS).

The bandwidth requirement for the phase-1 and phase-2 paths will now be derived. Considering a node i with maximum incoming traffic $R_i$, node i sends an amount $\alpha_j R_i$ of this traffic to node j during the first phase for each $j \in N$. Thus, the traffic demand from node i to node j as a result of phase-1 routing is $\alpha_j R_i$. At the end of phase 1, node i has received $\alpha_i R_k$ traffic from each node k. Out of the traffic received at node i after phase 1, the traffic destined for node j is $\alpha_i t_{kj}$, since all traffic is initially split in predetermined ratios without regard to the final destination. The traffic that needs to be routed from node i to node j during phase 2 is $\Sigma_{k \in N} \alpha_i t_{kj} \leq \alpha_i C_j$. Thus, the traffic demand from node i to node j as a result of phase-2 routing, i.e., the total traffic that needs to be routed from node i to node j during phase 2, is Hence, the maximum demand from node i to node j as a result of routing in phases 1 and 2 is $\alpha_j R_i + \alpha_i C_j$. It is noted that this routing scheme does not depend on the matrix $T \in T(\vec{R}, \vec{C})$. The scheme handles variability in traffic matrix $T \in T(\vec{R}, \vec{C})$ by effectively routing the fixed matrix $D=[d_{ij}]=[\alpha_j R_i + \alpha_i C_j]$ that depends only on aggregate ingress-egress capacities and the traffic-split ratios $\alpha_1, \alpha_2, \ldots, \alpha_n$, and not on the specific matrix $T \in T(\vec{R}, \vec{C})$, thereby rendering the routing scheme oblivious to changes in traffic distribution.

In an instance of the scheme, the traffic-split ratios $\alpha_1, \alpha_2, \ldots, \alpha_n$ and routing of the phase-1 and phase-2 paths are specified.

Some properties of two-phase routing that differentiate it from direct source-destination-path routing will now be discussed. Aspects of two different application scenarios are considered to illustrate the benefits of two-phase routing: (1) static optical-layer provisioning in IP-over-optical networks and (2) indirection in specialized service-overlay networks.

First considering static optical-layer provisioning in IP-over-optical networks, core IP networks are often deployed by interconnecting routers over a switched optical backbone. When applied to such networks, direct source-destination-path routing routes packets from source to destination along direct paths in the optical layer. It is noted that, even though these paths are fixed a priori and do not depend on the traffic matrix, their bandwidth requirements change with variations in the traffic matrix. Thus, bandwidth needs to be de-allocated from some paths and assigned to other paths as the traffic matrix changes. (Alternatively, paths between every source-destination pair can be provisioned a priori to handle the maximum traffic between them, but this can lead to gross overprovisioning of capacity, since all source-destination pairs cannot simultaneously reach their peak traffic limit in the hose-traffic model.) De-allocating bandwidth involves (i) detection of changes in traffic patterns and (ii) dynamic reconfiguration of the provisioned optical-layer circuits (i.e., change in bandwidth) in response to the detected changes. Both (i) and (ii) are difficult functionalities to deploy in current ISP networks.

Not only is the (current) traffic matrix difficult to estimate, but changes in the traffic matrix might not be detectable in real time. Direct-measurement methods do not scale with network size, since the number of entries in a traffic matrix is quadratic in the number of nodes. Moreover, such direct real-time monitoring methods may lead to unacceptable degradation in router performance. In reality, only aggregate link-traffic counts are available for traffic-matrix estimation. SNMP (Simple Network Management Protocol) can provide this data via incoming and outgoing byte counts computed per link every 5 minutes. To estimate the traffic matrix from such link traffic measurements, the best techniques today give errors of 20% or more.

Moreover, dynamic changes in routing in the network may be difficult or prohibitively expensive from a network-operations perspective. Despite continuing research on IP-optical integration, network deployments are far away from utilizing the optical-control plane to provide bandwidth provisioning in real time to the IP layer. The unavailability of network-control plane mechanisms for reconfiguring the network in response to and at time scales of changing traffic amplifies the necessity of static provisioning at the optical layer in any scheme that handles traffic variability. Direct source-destination-path routing does not provide this feature.

Figure 2:
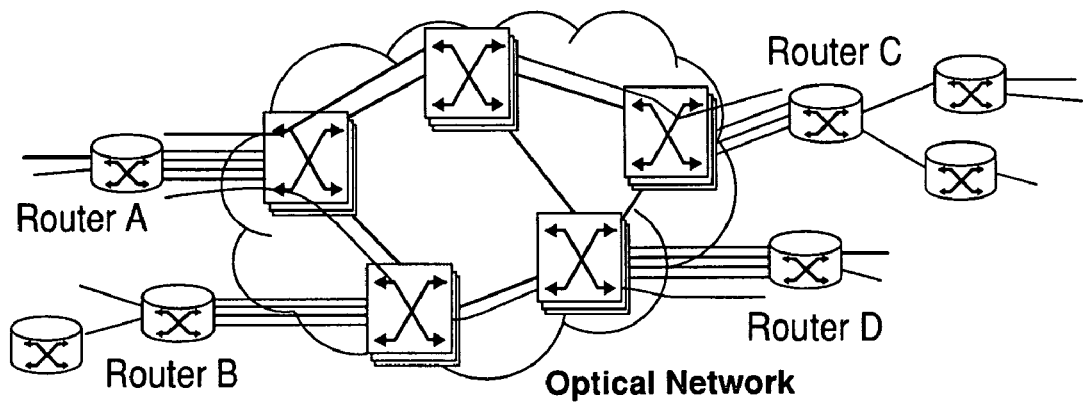
FIG. 2 is a diagram of destination routing through direct optical-layer circuits in IP-over-optical networks.

With reference now to FIG. 2, a diagram illustrating destination routing in IP-over-optical networks illustrates this point. As shown, router A is connected to router C using 3 OC-48 connections and to Router D using 1 OC-12 connection, so as to meet the traffic demand from node A to nodes C and D of 7.5 Gbps and 600 Mbps, respectively. If, at a later time, traffic from A to C decreases to 5 Gbps, while traffic from A to D increases to 1200 Mbps, then the optical layer must be reconfigured so as to delete one OC-48 connection between A and C and to create a new OC-12 connection between A and D. As such, static provisioning at the optical layer is not provided.

Two-phase routing, as envisaged for IP-over-optical networks, establishes the fixed-bandwidth phase-1 and phase-2 paths at the optical layer. Thus, the optical layer is statically provisioned and does not need to be reconfigured in response to traffic changes. IP packets are routed end-to-end with IP-layer processing at only a single intermediate node.

Next considering indirection in specialized service-overlay networks, the Internet Indirection Infrastructure (i3) was proposed in I. Stoica et al., "Internet Indirection Infrastructure," *ACM SIGCOMM* 2002, August 2002, incorporated herein by reference, to ease the deployment of services on the internet, such as mobility, multicast, and anycast. The infrastructure of i3 provides a rendezvous-based communication abstraction through indirection. Sources send packets to a logical identifier, and receivers express interest in packets sent to an identifier. The rendezvous points are provided by i3 servers that forward packets to all receivers that express interest in a particular identifier. The communication between senders and receivers is through these rendezvous points over an overlay network.

Two-phase routing can be used to provide Quality-of-Service (QoS) guarantees for variable traffic and support indirection in intra-ISP deployments of specialized service overlays like i3. (It is noted that Internet-wide deployment is not being considered in this scenario.) The intermediate nodes in the two-phase routing scheme are ideal candidates for locating i3 servers. Because a network whose topology is known is being considered, the two-phase routing scheme can be used not only to choose the i3 server locations (intermediate nodes), but also to traffic-engineer paths for routing with bandwidth guarantees between sender and receiver through i3 server nodes.

In service-overlay models like i3, the final destination of a packet is known only at the rendezvous node, not at the source. Because the final destination of a packet needs to be known only at the intermediate nodes in two-phase routing, it is well-suited for specialized service overlays as envisaged above. In contrast, for direct source-destination-path routing, the source needs to know the destination of a packet to be able to route the packet, thus rendering it unsuitable for such service-overlay networks.

Turning now to the generalization of traffic-split ratios, while the traffic-split ratios $\alpha_i$ can be generalized to depend on source or destination nodes of the traffic, or both, the following discussion relates to dependency on both source and destination nodes. While this generalization might not meet the indirection requirement of certain service overlays, such as i3, it can potentially increase the throughput performance of the two-phase routing scheme for other application scenarios, such as IP-over-optical networks.

If a fraction $\alpha_k^{ij}$ of the traffic that originates at node i whose destination is node j is routed to node k in phase 1, then the traffic-split ratios associated with any source-destination pair should sum to unity, i.e., $\Sigma_{k \in N} \alpha_k^{ij} = 1$ for all i,j∈N. The total demand that is needed between any nodes a and b to route phase-1 and phase-2 paths is computed, and the current traffic matrix is $T = [t_{ij}] \in T(\vec{R}, \vec{C})$. In the first phase, a fraction $\alpha_b^{ak}$ of the traffic $t_{ak}$ originating at node a and destined for node k is sent to intermediate node b. Thus, the demand from node a to node b for phase-1 traffic is $\Sigma_{k \in N} \alpha_b^{ak} t_{ak}$. A fraction $\alpha_b^{ak}$ of the traffic $t_{kb}$ originating at node k and destined for node b is sent to intermediate node a in phase 1 and needs to be routed to node b in the second phase. Thus, the demand from node a to node b for phase-2 traffic is $\Sigma_{k \in N} \alpha_a^{kb} t_{kb}$. Therefore, the total demand $\tau_{ab}$ that will be statically provisioned from node a to node b is the maximum value, taken over all traffic matrices $T \in T(\vec{R}, \vec{C})$, of the sum of the above two quantities representing demand for each phase, that is, $$\tau_{ab} = \max_{[t_{ij}] \in T(\vec{R},\vec{C})} \left[ \sum_{k \in N} \alpha_b^{ak} t_{ak} + \sum_{k \in N} \alpha_a^{kb} t_{kb} \right]. \tag{14}$$

The quantity above appears to involve bilinear terms but can be conveniently accommodated into an LP. In fact, one aspect of certain embodiments of the present invention is the provision of the first polynomial-size LP for maximum-throughput two-phase routing of hose traffic with generalized traffic-split ratios.

Figure 3:
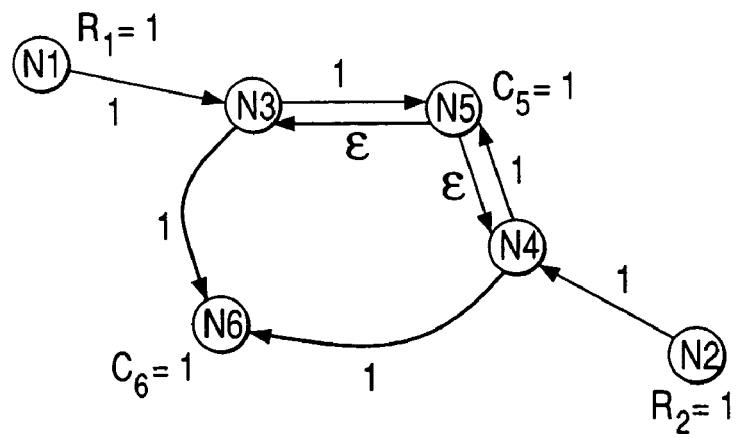
FIG. 3 is a diagram of a 6-node network illustrating throughput improvement with generalized traffic-split ratios for two-phase routing in a routing scheme consistent with one embodiment of the present invention.

To illustrate the improvement in throughput when the traffic-split ratios are generalized in the foregoing manner, the example of FIG. 3 is provided. In this scenario, a 6-node network with nodes N1-N6 is shown, wherein $R_1 = R_2 = 1$ and $C_5 = C_6 = 1$, and all other $R_i C_j$ values are zero. The capacities of links (N5,N3) and (N5,N4) are each equal to some small quantity $\epsilon > 0$. All other links shown have unit capacity.

It can be observed that node N1 has a unit-capacity path to node N3, but the capacity of the path to node N4 is small ($=\epsilon$). Similarly, node N2 has a unit-capacity path to node N4, but the capacity of the path to node N3 is small ($=\epsilon$). Thus, when maximizing throughput, node N4 is not a good choice for serving as intermediate node for the traffic originating at node N1. Similarly, node N3 is not a good choice for serving as intermediate node for the traffic originating at node N2. If the traffic-split ratios are dependent on intermediate nodes only (and not on the source or the destination of traffic), then the throughput of two-phase routing will be small. By making the traffic-split ratios also dependent on the source of traffic, two-phase routing can completely avoid routing along the links with small capacities. In fact, the gap between the throughputs of two-phase routing with intermediate-node-dependent traffic-split ratios $\alpha_k$ and generalized traffic-split ratios $\alpha_k^{ij}$ can be made arbitrarily large by making the value of $\epsilon$ arbitrarily small.

However, in view of the 2-optimality result for two-phase routing that uses only intermediate-node-dependent traffic-split ratios and assumes $R_i=C_j$ for all i (as will be discussed in further detail hereinbelow), it follows that such pathological examples where the throughput improvement with generalized split ratios is arbitrarily large (or, even greater than 2) do not exist when ingress-egress capacities are symmetric.

Given a network with link capacities $u_e$ and constraints $R_i, C_j$ on the ingress-egress traffic, the problem of two-phase routing with generalized traffic-split ratios so as to maximize the network throughput will now be considered. The throughput is the maximum multiplier $\lambda$, such that all matrices in $\lambda \cdot T(\vec{R},\vec{C})$ can be feasibly routed under given link capacities.

First, an LP formulation with an infinite number of constraints and a polynomial-size separation-oracle LP will be considered, and then the two LPs will be combined into a polynomial-size LP that can be solved in polynomial time using a general linear-programming algorithm.

With respect to the LP with infinite constraints and a separation oracle, the routing of an amount $d_{ab}$ of traffic, as given by equation (14) above, for each source-destination pair (a,b) can be specified by a set of flow variables $x_e^{ab}$, where $x_e^{ab}$ denotes the amount of traffic from node a to node b that traverses link e in the network. The variable $\mu$ denotes the maximum utilization of any link in the network. Maximizing the throughput is equivalent to minimizing the maximum-link utilization $\mu$. The exemplary linear program is formulated as follows, with the constraints of equations (16) and (18) and inequalities (15), (17), (19), and (20):

minimize $\mu$,
subject to $$\tau_{ab} \geq \sum_{k \in N} \alpha_b^{ak} t_{ak} + \sum_{k \in N} \alpha_a^{kb} t_{kb} \forall a, b \in N, \qquad (15)$$

$$\sum_{e \in E^+(k)} x_e^{ij} - \sum_{e \in E^-(k)} x_e^{ij} = \begin{cases} +\tau_{ij} & \text{if } k = i \\ -\tau_{ij} & \text{if } k = j \\ 0 & \text{otherwise} \end{cases} \forall i, j, k \in N, \qquad (16)$$

$$\sum_{i,j \in N} x_e^{ij} \leq \mu u_e \forall e \in E, \qquad (17)$$

$$\sum_{k \in N} \alpha_k^{ab} = 1 \forall a, b \in N, \qquad (18)$$

$$\alpha_k^{ab} \geq 0 \forall k, a, b \in N, \qquad (19)$$

$$x_e^{ij} \geq 0 \forall e \in E, \forall i, j \in N. \qquad (20)$$

The constraints of inequality (15) correspond to the value of the demand $\tau_{ab}$ from node a to node b, as given in equation (14). The constraint of equation (16) corresponds to the routing of flows between each source-destination pair of the required value. The constraints of inequality (17) are the maximum-utilization constraints for each link. The constraints of equation (18) correspond to the traffic-split ratios summing to 1 for each source-destination pair. The quantities $t_{ij}$ in the right-hand side of inequality (15) are constants, and hence, the constraints are linear. It is noted that there is an infinite set of constraints in inequality (15), since there are n(n−1) constraints for each $[t_{ij}] \in T(\vec{R},\vec{C})$.

The above LP can be solved in polynomial time by the ellipsoid algorithm, as provided in Schrijver, cited hereinabove, provided that a polynomial-time separation-oracle for the constraints of inequality (15) can be found. Given a set of values for the variables in the above LP, the separation oracle should identify at least one constraint that is violated (if any), or indicate otherwise. Clearly, the constraints of equations (16) and (18) and inequality (17) can be verified in polynomial time.

To determine if the constraints in inequality (15) are violated for any link, either a source-destination pair (a,b) and a traffic matrix $[t_{ij}] \in T(\vec{R},\vec{C})$ should be identified such that the corresponding constraint is violated, or it should be determined that all such constraints are satisfied. This can be done by verifying that for each source-destination pair (a,b), the following LP, with variables $t_{ij} \forall i,j \in N$, has an optimum objective-function value of at most $\tau_{ab}$. If not, the traffic matrix $[t_{ij}]$ obtained in an optimal solution of the LP identifies the corresponding violating constraint in inequality (15). The exemplary linear program is formulated as follows, with the constraints of inequalities (21), (22), and (23):

$$\text{maximize} \sum_{k \in N} \alpha_b^{ak} t_{ak} + \sum_{k \in N} \alpha_a^{kb} t_{kb},$$

subject to $$\sum_{j \in N, j \neq i} t_{ij} \leq R_i \forall i \in N, \qquad (21)$$

$$\sum_{i \in N, i \neq j} t_{ij} \leq C_j \forall j \in N, \qquad (22)$$

$$t_{ij} \geq 0 \forall i, j \in N. \qquad (23)$$

As noted earlier, the ellipsoid algorithm gives running times that are not feasible for practical implementations, which provides the motivation for designing a polynomial-size LP for the above problem.

To develop the polynomial-size LP, the dual of the separation-oracle LP above is first considered. For a given source-destination pair (a,b), the dual LP has non-negative variables r(i,a,b) corresponding to each constraint in inequality (21) and non-negative variables c(i,a,b) corresponding to each constraint in inequality (22). The exemplary dual linear program is formulated with the constraints of inequalities (24)-(27), as follows:

minimize $\Sigma_{i \in N} R_i r(i,a,b) + \Sigma_{j \in N} C_j c(j,a,b)$, subject to $$r(a,a,b)+c(b,a,b) \geq \alpha_a^{ab}+\alpha_d^{ab}, \qquad (24)$$

$$r(a,a,b)+c(k,a,b) \geq \alpha_b^{ak} \forall k \in N, k \neq b, \qquad (25)$$

$$r(k,a,b)+c(b,a,b) \geq \alpha_a^{kb} \forall k \in N, k \neq a, \qquad (26)$$

$$r(i,a,b), c(i,a,b) \geq 0 \forall i \in N. \qquad (27)$$

It follows directly from strong duality of linear programming that for each source-destination pair (a,b), the primal (separation-oracle) LP has an optimum objective-function value of at most $\tau_{ab}$ if and only if the dual LP has a feasible solution with an objective-function value of at most $\tau_{ab}$. The requirement that the dual LPs, for all a,b∈N, have feasible solutions with an objective-function value of at most $\tau_{ab}$, can be modeled as the following constraint:

$$\sum_{i \in N} R_i r(i, a, b) + \sum_{j \in N} C_j c(j, a, b) \leq \tau_{ab} \forall a, b \in N. \quad (5)$$

This permits removal of the infinite set of constraints in inequality (15) and addition of the above constraint and the constraints of inequalities (24)-(27) from the dual LPs to obtain the following polynomial-size LP, which is formulated with the constraints of equations (28) and (30) and inequalities (29) and (31)-(37):

minimize $\mu$,
subject to $$\sum_{e \in E^+(k)} x_e^{ij} - \sum_{e \in E^-(k)} X_e^{ij} = \begin{cases} +\tau_{ij} & \text{if } k = i \\ -\tau_{ij} & \text{if } k = j, \forall i, j, k \in N, \\ 0 & \text{otherwise} \end{cases} \quad (28)$$

$$\sum_{i,j \in N} x_e^{ij} \leq \mu u_e \forall e \in E, \quad (29)$$

$$\sum_{k \in N} \alpha_k^{ab} = 1 \forall a, b \in N, \quad (30)$$

$$\sum_{i \in N} R_i r(i, a, b) + \sum_{j \in N} C_j c(j, a, b) \leq \tau_{ab} \forall a, b \in N, \quad (31)$$

$$r(a, a, b) + c(b, a, b) \geq \alpha_a^{ab} + \alpha_b^{ab} \forall a, b \in N, \quad (32)$$

$$r(a, a, b) + c(k, a, b) \geq \alpha_b^{ak} \forall k, a, b \in N, \quad (33)$$

$$r(k, a, b) + c(b, a, b) \geq \alpha_a^{kb} \forall k, a, b \in N, \quad (34)$$

$$\alpha_k^{ab} \geq 0 \forall k, a, b \in N, \quad (35)$$

$$x_e^{ij} \geq 0 \forall e \in E, \forall i, j \in N, \quad (36)$$

$$r(i, a, b), c(i, a, b) \geq 0 \forall i, a, b \in N. \quad (37)$$

The foregoing LP has $n^2(n-1)$ constraints in equation (28), m constraints in inequality (29), $n(n-1)$ constraints in each of equation (30) and inequalities (31) and (32), $n(n-1)(n-2)$ constraints in each of inequalities (33) and (34), $n^2(n-1)$ constraints in inequality (35), $mn(n-1)$ constraints in inequality (36), and $2n^2(n-1)$ constraints in inequality (37), for a total of $O(mn^2)$ constraints. The number of variables is $n^2(n-1)+n(n-1)+mn(n-1)+2n^2(n-1)=O(mn^2)$.

By using per-source flow variables $x_e^i$ instead of per-source-destination variables $x_e^{ij}$, the number of variables and constraints in the above LP can be reduced to $O(n^3)$.

Considering now the optimality bound for two-phase routing, two-phase routing specifies ratios for splitting traffic among intermediate nodes and phase-1 and phase-2 paths for routing the traffic. Thus, two-phase routing is one form of fixed-path routing. However, as has been explained above, two-phase routing has the desirable property of static provisioning that a general solution of fixed-path routing (e.g., direct source-destination-path routing) might not have. Moreover, when the traffic-split ratios in two-phase routing depend on intermediate nodes only, the scheme does not require the final destination of a packet to be known at the source, which is an indirection property that is required of specialized service overlays, such as i3.

As mentioned above, the present invention, in various embodiments, originates from an investigation to determine whether the desirable properties of two-phase routing also involve incurring any resource (throughput) overhead as compared to (i) direct source-destination-path routing, and (ii) an optimal routing scheme among the class of all routing schemes that are allowed to reconfigure the routing so as to be dynamically dependent on the traffic matrix. This issue is addressed from two approaches. First, using the polynomial-size LP formulations set forth above, the throughput of two-phase routing is compared with that of direct source-destination-path routing on actual ISP topologies. Using upper bounds on the throughput of an optimal scheme computed, as will be discussed in further detail hereinbelow, the throughput of two-phase routing is compared with that of an optimal scheme. Second, the throughput requirements of two-phase routing are analyzed from a theoretical perspective, and a 2-optimal bound is established. That is, the throughput of two-phase routing is at least half that of the best possible scheme in which the routing can be dependent on the traffic matrix. The generality of this result, which compares two-phase routing with the most general class of schemes for routing hose traffic, should be emphasized.

With respect to the characterization of an optimal scheme, the class of all schemes for routing all matrices in $T(\vec{R}, \vec{C})$, wherein the routing can be made dependent on the traffic matrix, is considered. For any scheme A, the expression A(e, T) represents the traffic on link e when matrix T is routed by A. Then, the throughput $\lambda_A$ of scheme A is given by:

$$\lambda_A = \min_{e \in E} \frac{u_e}{\max_{T \in \mathcal{T}(\vec{R}, \vec{C})} A(e, T)}.$$

An optimal scheme is the one that achieves the maximum throughput $\lambda_{OPT}$ among all schemes, as given by:

$$\lambda_{OPT} = \max_{\mathcal{A}} \lambda_A.$$

In the following lemma, the throughput of an optimal scheme is expressed in another way. For each $T \in T(\vec{R}, \vec{C})$, the expression $\lambda(T)$ represents the maximum throughput achievable for routing the single matrix T.

Lemma 1: The throughput of an optimal scheme is given by:

$$\lambda_{OPT} = \min_{T \in \mathcal{T}(\vec{R}, \vec{C})} \lambda(T).$$

At first glance, an optimal scheme that maximizes throughput may appear to be hard to specify because it can route each traffic matrix differently, and there are infinitely many matrices in $T(\vec{R}, \vec{C})$. However, because the link capacities are given in the throughput-maximization model, an optimal scheme can be characterized in a relatively simple way. Given a traffic matrix as input, it is routed in a manner that maximizes its throughput. Routing a single matrix so as to maximize its throughput is also known as the maximum-concurrent-flow problem, as described, e.g., in F. Shahrokhi et al., "The Maximum Concurrent Flow Problem," *Journal of ACM*, 37(2):318-334, 1990, incorporated herein by reference, and is solvable in polynomial time. Clearly, the routing is dependent on the traffic matrix and can be different for different matrices.

The problem of computing $\lambda_{OPT}$ can be shown to be co-NP hard. Computing the cost of an optimal scheme for the minimum-cost network-design version of the problem is also known to be co-NP hard. An optimal scheme for minimum-cost network design does not even appear to have a simple characterization, as in the case of maximum-throughput network routing.

Turning now to the 2-optimality result for two-phase routing, the 2-optimal bound for two-phase routing establishes that two-phase routing provides a 2-approximation to an optimal scheme for both maximum-throughput network routing and minimum-cost network design. This may be viewed as an important theoretical contribution, given the computational intractability of optimal schemes for both problems.

Even though this theoretical result shows that the throughput of two-phase routing, in the worst case, can be as low as half that of an optimal scheme (and hence that of direct source-destination-path routing), the experiments described hereinbelow indicate that two-phase routing performs much better in practice, and that the throughput of two-phase routing matches that of direct source-destination-path routing and is within 6% of that of an optimal scheme on all evaluated topologies.

It is assumed that $R_i=C_j$ for all nodes i. This is not a restrictive assumption because network routers and switches have bidirectional ports (line cards), and hence, the ingress and egress capacities are equal.

Theorem 1: Let $R_i=C_j$ for all nodes i, and $R=\Sigma_{i\in N}R_i$. The throughput-maximization problem under given link capacities is considered. Then, the throughput of an optimal scheme is at most $$2\left(1-\frac{1}{R}\min_{i\in N}R_i\right)$$

times that of two-phase routing.

Theorem 2: Let $R_i=C_j$ for all nodes i, and $R=\Sigma_{i\in N}R_i$. The minimum-cost network-design problem under given link costs for unit traffic is considered. Then, the cost of two-phase routing is at most $$2\left(1-\frac{1}{R}\min_{i\in N}R_i\right)$$

times that of an optimal scheme.

Upper-Bounding Optimal-Scheme Throughput

Lastly, a method will be discussed for upper-bounding the throughput of an optimal scheme among the class of all routing schemes that are allowed to reconfigure the routing so as to be dynamically dependent on the traffic matrix. In view of the discussion hereinabove regarding the computational intractability of the throughput of an optimal scheme, this upper bound will be useful in comparing the throughput of two-phase routing and direct source-destination-path routing with that of an optimal scheme.

From Lemma 1, $\lambda_{OPT}=\min_{T\in T(\vec{R},\vec{C})}\lambda(T)$. Thus, it is desirable to identify a matrix $T\in T(\vec{R},\vec{C})$ for which $\lambda(T)$ is minimum, a matrix which is hard to compute. Taking any single matrix $T\in T(\vec{R},\vec{C})$ and computing its maximum throughput $\lambda(T)$, the maximum throughput for routing a single matrix under given link capacities can be solved using the maximum concurrent-flow problem, as described, e.g., in F. Shahrokhi, cited hereinabove. This certainly provides an upper bound on $\lambda_{OPT}$, since $\lambda_{OPT}\leq\lambda(T)$. A heuristic approach is used to find a matrix that provides tight upper bounds.

Considering a matrix T with throughput $\lambda(T)$, whose maximum-throughput routing uses $x_e$ capacity on link e, since $\lambda(T)\,x_e\leq u_e$ for all e, the expression $\Sigma_{e\in E}\lambda(T)x_e\leq\Sigma_{e\in E}u_e$ holds true, and thus, $$\lambda_{OPT}\leq\lambda(T)\leq\frac{\sum_{e\in E}u_e}{\sum_{e\in E}x_e}.$$

If B(T) represents the minimum bandwidth required to route matrix T, then $\Sigma_{e\in E}x_e\geq B(T)$, and therefore, $$\lambda_{OPT}\leq\frac{\sum_{e\in E}u_e}{B(T)}.$$

Thus, the least upper bound obtained in this manner is given by:

$$\lambda_{OPT}\leq\frac{\sum_{e\in E}u_e}{\max_{T\in T(\vec{R},\vec{C})}B(T)}. \tag{38}$$

The matrix $T\in T(\vec{R},\vec{C})$ that takes the highest bandwidth to route can be computed in polynomial time as follows. The minimum-bandwidth routing routes all demands along shortest-hop paths. The variable $d_{ij}$ denotes the hop count of a shortest path from node i to node j for all i,j$\in$N. Then, the problem of determining the traffic matrix $T=[t_{ij}]\in T(\vec{R},\vec{C})$ that takes the maximum bandwidth to route can be formulated as the following linear program, with the constraints of inequalities (39)-(41):

$$\text{maximize}\sum_{i,j\in N}d_{ij}t_{ij},$$

subject to $$\sum_{j\in N, j\neq i}t_{ij}\leq R_i\,\forall\,i\in N, \tag{39}$$

$$\sum_{i\in N, i\neq j}t_{ij}\leq C_j\,\forall\,j\in N, \tag{40}$$

$$t_{ij}\geq 0\,\forall\,i,j\in N. \tag{41}$$

The required bandwidth B(T) is the objective function of the linear program, and the ingress-egress traffic capacities that define $T(\vec{R},\vec{C})$ form the constraints. If the optimum solution to this linear program is the matrix T*, then the value of $B(T^*)=\max_{T\in T(\vec{R},\vec{C})}B(T)$ thus obtained provides an upper bound on $\lambda_{OPT}$ using inequality (38). It is noted that maximum-throughput routing does not necessarily route along shortest paths. Hence, the throughput $\lambda(T^*)$ of the matrix $T^*$ can actually be computed, and, since $\lambda_{OPT} \leq \lambda(T^*)$, it can be verified whether two-phase routing provides a better upper bound (it should be recognized that a similar method could be used to determine whether two-phase routing provides a better lower bound). In all of the experiments of the inventors herein, two-phase routing provided a better upper bound.

Throughput Comparisons

The throughput performance of four schemes for routing hose traffic will now be compared: (i) two-phase routing with intermediate-node-dependent traffic-split ratios $\alpha_i$, (ii) two-phase routing with generalized traffic-split ratios $\alpha_k^{ij}$, (iii) direct source-destination-path routing, and (iv) an optimal routing scheme. For (i), the linear-programming formulation with $\alpha_i$ traffic-split ratios was used. For (ii) and (iii), the linear-programming formulations described hereinabove were used, and for (iv), the method described herein above was used to obtain an upper bound. All of the linear programs were solved using ILOG CPLEX as an LP solver.

For the experiments of the inventors herein, six ISP topologies collected by an ISP-topology-mapping engine called Rocketfuel were used, as described in N. Spring et al., "Measuring ISP Topologies with Rocketfuel," *IEEE/ACM Transactions on Networking*, vol. 12, no. 1, pp. 2-16, February 2004, incorporated herein by reference. These topologies list multiple intra-PoP (Point-of-Presence) routers and/or multiple intra-city PoPs as individual nodes. PoPs were coalesced into nodes corresponding to cities, so that the topologies represented geographical PoP-to-PoP ISP topologies. With reference to FIG. 4, data about the original Rocketfuel topologies and their coalesced versions is provided in Table I.

Link capacities, which are used to compute the maximum throughput, are not available for these topologies. Rocketfuel computed OSPF (Open-Shortest-Path-First)/IS-IS (Intermediate-System-to-Intermediate-System) link weights for the topologies so that shortest-cost paths match observed routes. In order to deduce the link capacities from the weights, it was assumed that the given link weights are the default settings for OSPF weights in Cisco routers, i.e., inversely proportional to the link capacities. The link capacities obtained in this manner turned out to be symmetric, i.e., $u_{ij} = u_{ji}$ for all $(i,j) \in E$.

There is also no available information on the ingress-egress traffic capacities at each node. Because ISPs commonly engineer their PoPs to keep the ratio of add/drop and transit traffic approximately fixed, it was assumed that the ingress-egress capacity at a node is proportional to the total capacity of network links incident at that node. It was assumed that $R_i = C_j$ for all nodes i, since network routers and switches have bidirectional ports (line cards), and thus, the ingress and egress capacities are equal. Accordingly, $R_i (=C_j) \propto \Sigma_{e \in E^+(i)} u_e$.

The throughput values for the three different schemes are denoted herein as follows: (i) $\lambda_{TPR}$ for two-phase routing with intermediate-node-dependent traffic-split ratios, (ii) $\lambda_{GTPR}$ for two-phase routing with generalized traffic-split ratios, and (iii) $\lambda_{DPR}$ for direct source-destination-path routing. Clearly, $\lambda_{TPR} \leq \lambda_{GTPR} \leq \lambda_{DPR} \leq \lambda_{OPT}$.

The quantity $\lambda_{TPR}/\lambda_{OPT}$ yields the closeness of the throughput performance of two-phase routing (with $\alpha_i$ traffic-split ratios) to that of the optimal scheme. With reference to FIG. 5, a lower bound on this quantity, expressed as a percentage, is listed in Table II for the six Rocketfuel topologies. The lower bound on $\lambda_{TPR}/\lambda_{OPT}$ is obtained by using the method discussed hereinabove to compute an upper bound for $\lambda_{OPT}$. Table II shows that the throughput performance of two-phase routing with intermediate-node-dependent split ratios $\alpha_i$ is within 6% of that of the optimal scheme. (For two of the topologies, Telstra 1221 and Exodus 3967, the throughput performance of two-phase routing actually matches that of the optimal scheme.) Hence, for these topologies, there is clearly not much room for throughput improvement when the traffic-split ratios are generalized in two-phase routing, or even when arbitrary fixed-path routing solutions are considered.

For the Tiscali 3257 topology, the CPLEX processes for solving the linear programs for $\lambda_{GTPR}$ and $\lambda_{TPR}$ ran out of memory and were killed on a 2.4 GHz Dual Xeon machine with 1 GB of RAM and running Linux. This was the fastest machine with the highest RAM that was used in the experiments for running CPLEX. For the Exodus 3967 and Telstra 1221 topologies, the throughput of two-phase routing with traffic-split ratios $\alpha_i$ matches that of the optimal scheme (as set forth in Table II), and hence, $\lambda_{TPR} = \lambda_{GTPR} = \lambda_{DPR}$. The throughput of two-phase routing with traffic-split ratios $\alpha_i$ was also observed to match that of the optimal scheme in the case of the remaining three Rocketfuel topologies.

Thus, on five of the six Rocketfuel topologies, the throughput of two-phase routing with $\alpha_i$ traffic split ratios equals that with generalized traffic-split ratios and matches the throughput of direct source-destination routing along fixed paths. (Recalling that the pathological example for the improvement in throughput of two-phase routing with generalized traffic-split ratios, as described hereinabove, exploited $R_i \neq C_j$ for some nodes i and for asymmetric link capacities, neither of these scenarios is present in the Rocketfuel topologies.)

Given the identical throughput performance of the two versions of two-phase routing, the simpler version with intermediate-node-dependent traffic-split ratios $\alpha_i$ is preferred because of its ability to support indirection in specialized service-overlay models such as i3.

The foregoing-described experiments on actual ISP topologies indicate that two-phase routing achieves its robustness to traffic variation without compromising throughput performance, as compared to previous approaches, such as direct source-destination-path routing. The throughput performance of two-phase routing is within 6% of that of the optimal scheme on the evaluated topologies. Thus, two-phase routing is able to handle highly-variable traffic in a capacity-efficient manner and to provide the desirable properties of (i) static provisioning at the optical layer in IP-over-optical networks, and (ii) supporting indirection in specialized service-overlay networks. Direct source-destination routing does not provide these features.

The two-phase routing scheme was recently proposed for routing highly-dynamic and changing traffic patterns on the Internet with QoS guarantees. If deployed, it would allow service providers to operate their networks in a quasi-static manner, where both intra-domain paths and the bandwidths allocated to these paths are robust to extreme traffic variation. The scheme has the desirable properties of supporting (i) static optical-layer provisioning in IP-over-optical networks, and (ii) indirection in specialized service-overlay models, such as i3. These are not supported by other approaches for routing hose traffic, such as direct source-destination routing along fixed paths.

The conclusion that the throughput of two-phase routing is within 6% of that of the optimal scheme on all of the evaluated topologies should lead to increased acceptance of a two-phase routing-based architecture for routing highly-variable traffic and should mitigate any concerns that the desirable properties of two-phase routing incur substantial overprovisioning of capacity.

It should be recognized that it might be possible to improve the 2-optimality throughput bound of two-phase routing under special assumptions, e.g., small-degree graphs. The motivation for this is the empirical evidence that the performance of two-phase routing is much better on ISP topologies, which are characterized by small nodal degree, as was true for all the Rocketfuel topologies considered in the experiments described herein.

It should be recognized that the present invention could be used with any type of wireless networks, wired networks, optically-connected networks, or hybrid networks that include combinations of wired, wireless, and/or optically-connected elements.

The various functions of a method consistent with one embodiment of the present invention may be implemented with circuit elements or may also be implemented in the digital domain as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

It will be further understood that various changes in the details, materials, and arrangements of the parts which have been described and illustrated in order to explain the nature of this invention may be made by those skilled in the art without departing from the principle and scope of the invention as expressed in the following claims.

We claim:

1. A method of routing traffic in a network of nodes interconnected by links and having at least one ingress point and at least one egress point, the method comprising:
solving, using a computer, a polynomial-size linear program derived from a combination of:
a first liner program having infinite constraints and adapted to minimize maximum-link utilization of a link in a path between the ingress point and the egress point; and
a second linear program adapted to determine whether any constraint of the first linear program is violated;
implementing, during a first routing phase, based on the solution to the polynomial-size linear problem, a first routing method for routing a fraction of traffic between the at least one ingress point and at least one intermediate node; and
implementing, during a second routing phase, based on the solution to the polynomial-size linear problem, a second routing method for routing a fraction of traffic between the at least one intermediate node and the at least one egress point.

2. The invention of claim 1, wherein the constraints of the first linear program are derived using variables representing (i) the routing of flows between each of one or more source-destination pairs between the ingress point and the egress point and (ii) the maximum utilization constraint for each link between the ingress point and the egress point.

3. The invention of claim 1, wherein the first linear program is adapted to be solved by an ellipsoid algorithm.

4. The invention of claim 1, wherein the constraints of the polynomial-size linear program comprise constraints derived from a dual problem of the second linear program.

5. The invention of claim 4, wherein the constraints derived from the dual problem of the second linear program replace the infinite constraints of the first linear program.

6. The invention of claim 1, wherein:
the data-routing scheme is a fixed-path routing scheme; and
the first linear program is adapted to receive as input a set of unit-flow variables specifying fixed-path routing for each of the one or more source-destination pairs between the ingress point and the egress point.

7. The invention of claim 6, wherein the polynomial-size linear program is:

minimize $\mu$, subject to $$\sum_{e \in E^+(k)} f_e^{ij} - \sum_{e \in E^-(k)} f_e^{ij} = \begin{cases} +1 & \text{if } k = i \\ -1 & \text{if } k = j, \\ 0 & \text{otherwise} \end{cases} \forall\, i, j, k \in N, \quad (9)$$

$$r(i, \ell) + c(j, \ell) \geq f_\ell^{ij} / u_\ell \forall\, \ell \in E, \forall\, i, j \in N, \quad (10)$$

$$\sum_{i \in N} R_i r(i, \ell) + \sum_{j \in N} C_j c(j, \ell) \leq \mu \forall\, \ell \in E, \quad (11)$$

$$r(i, \ell) + c(j, \ell) \geq 0 \ \forall\, i \in N, \forall\, \ell \in E, \quad (12)$$

$$f_e^{ij} \geq 0 \ \forall\, e \in E, \forall\, i, j \in N, \quad (13)$$

wherein:
N represents the set of nodes in the network;
E represents the set of links in the network;
$E^-(i)$ and $E^+(i)$ represent sets of incoming and outgoing edges, respectively, at node i;
$\mu$ represents maximum-link utilization of any link in the network;
$f_e^{ij}$ is a unit-flow variable representing a fraction of traffic from a source node i to a destination node j that traverses link e in the network;

$u_e$ represents capacity of link e;
k represents an intermediate node between nodes i and j;
l represents each link in set E;
$R_i$ represents upper bounds on a total amount of traffic entering the network at node i;
$C_j$ represents upper bounds on a total amount of traffic leaving the network at node j; and
r(i,l) and c(j,l) are non-negative variables corresponding to constraints in the second linear program.

8. The invention of claim 1, wherein:
the first linear program is adapted to receive as input a set of flow variables specifying an amount of traffic across each of one or more source-destination pairs between the ingress point and the egress point that traverse a given link.

9. The invention of claim 8, wherein the polynomial-size linear program is:

minimize $\mu$, subject to $$\sum_{e \in E^+(k)} x_e^{ij} - \sum_{e \in E^-(k)} X_e^{ij} = \begin{cases} +\tau_{ij} & \text{if } k = i \\ -\tau_{ij} & \text{if } k = j, \quad \forall i, j, k \in N, \\ 0 & \text{otherwise} \end{cases} \quad (28)$$

$$\sum_{i,j \in N} x_e^{ij} \leq \mu u_e \forall e \in E, \quad (29)$$

$$\sum_{k \in N} \alpha_k^{ab} = 1 \forall a, b \in N, \quad (30)$$

$$\sum_{i \in N} R_i r(i, a, b) + \sum_{j \in N} C_j c(j, a, b) \leq \tau_{ab} \forall a, b \in N, \quad (31)$$

$$r(a, a, b) + c(b, a, b) \geq \alpha_a^{ab} + \alpha_b^{ab} \forall a, b \in N, \quad (32)$$

$$r(a, a, b) + c(k, a, b) \geq \alpha_b^{ak} \forall k, a, b \in N, \quad (33)$$

$$r(k, a, b) + c(b, a, b) \geq \alpha_a^{kb} \forall k, a, b \in N, \quad (34)$$

$$\alpha_k^{ab} \geq 0 \forall k, a, b \in N, \quad (35)$$

$$x_e^{ij} \geq 0 \forall e \in E, \forall i, j \in N, \quad (36)$$

$$r(i, a, b) + c(i, a, b) \geq 0 \forall i, a, b \in N, \quad (37)$$

wherein:
N represents the set of nodes in the network;
E represents the set of links in the network;
$E^-(i)$ and $E^+(i)$ represent sets of incoming and outgoing edges, respectively, at node i;
$\mu$ represents maximum-link utilization of any link in the network;
$x_e^{ij}$ is a flow variable representing a fraction of traffic from a source node i to a destination node j that traverses a link e in the network;
$u_e$ represents a capacity of link e;
k represents an intermediate node between nodes i and j;
l represents each link in set E;
$R_i$ represents upper bounds on a total amount of traffic entering the network at node i;
$C_j$ represents upper bounds on a total amount of traffic leaving the network at node j;
r(k,a,b) and c(k,a,b) are non-negative variables corresponding to constraints in the second linear program;
$\alpha_k^{ab}$ represents a fraction of traffic originating at node k and destined for node b, which is sent to intermediate node a in phase 1 and is routed to node b in phase 2 of the two-phase routing scheme;
$\tau_{ab}$ represents a total demand to be statically provisioned from node a to node b.

10. Apparatus for routing trafficking a network of nodes interconnected by links and having at least one ingress point and at least one egress point, the apparatus comprising:
means for solving, using a computer, a polynomial-size liner program derived from a combination of:
a first liner program having infinite constraints and adapted to minimize maximum-link utilization of a link in a path between the ingress point and the egress point; and
a second linear program adapted to determine whether any constraint of the first linear program is violated;
means for implementing, during a first routing phase, based on the solution to the polynomial-size liner problem, a first routing method for routing a fraction of traffic between the at least one ingress point and at least one intermediate node; and
means for implementing, during a second routing phase, based on the solution to the polynomial-size linear problem, a second routing method for routing a fraction of traffic between the at least one intermediate node and the at least one egress point.

11. The invention of claim 10, wherein the constraints of the first linear program are derived using variables representing (i) the routing of flows between each of one or more source-destination pairs between the ingress point and the egress point and (ii) the maximum utilization constraint for each link between the ingress point and the egress point.

12. The invention of claim 10, wherein the first linear program is adapted to be solved by an ellipsoid algorithm.

13. The invention of claim 10, wherein the constraints of the polynomial-size linear program comprise constraints derived from a dual problem of the second linear program.

14. The invention of claim 13, wherein the constraints derived from the dual problem of the second linear program replace the infinite constraints of the first linear program.

15. The invention of claim 10, wherein:
the data-routing scheme is a fixed-path routing scheme; and
the first linear program is adapted to receive as input a set of unit-flow variables specifying fixed-path routing for each of the one or more source-destination pairs between the ingress point and the egress point.

16. The invention of claim 15, wherein the polynomial-size linear program is:

minimize $\mu$, subject to $$\sum_{e \in E^+(k)} f_e^{ij} - \sum_{e \in E^-(k)} f_e^{ij} = \begin{cases} +1 & \text{if } k = i \\ -1 & \text{if } k = j, \quad \forall i, j, k \in N, \\ 0 & \text{otherwise} \end{cases} \quad (9)$$

$$r(i, \ell) + c(j, \ell) \geq f_l^{ij}/u_\ell \forall \ell \in E, \forall i, j \in N, \quad (10)$$

$$\sum_{i \in N} R_i r(i, \ell) + \sum_{j \in N} C_j c(j, \ell) \leq \mu \forall \ell \in E, \quad (11)$$

$$r(i, \ell) + c(j, \ell) \geq 0 \forall i \in N, \forall \ell \in E, \quad (12)$$

$$f_e^{ij} \geq 0 \forall e \in E, \forall i, j \in N, \quad (13)$$

wherein:
- N represents the set of nodes in the network;
- E represents the set of links in the network;
- $E^-(i)$ and $E^+(i)$ represent sets of incoming and outgoing edges, respectively, at node i;
- $\mu$ represents maximum-link utilization of any link in the network;
- $f_e^{ij}$ is a unit-flow variable representing a fraction of traffic from a source node i to a destination node j that traverses link e in the network;
- $u_e$ represents capacity of link e;
- k represents an intermediate node between nodes i and j;
- l represents each link in set E;
- $R_i$ represents upper bounds on a total amount of traffic entering the network at node i;
- $C_i$ represents upper bounds on a total amount of traffic leaving the network at node j; and
- r(i,l) and c(j,l) are non-negative variables corresponding to constraints in the second linear program.

17. The invention of claim 10, wherein:
the first linear program is adapted to receive as input a set of flow variables specifying an amount of traffic across each of one or more source-destination pairs between the ingress point and the egress point that traverse a given link.

18. The invention of claim 17, wherein the polynomial-size linear program is:

minimize $\mu$, subject to $$\sum_{e \in E^+(k)} x_e^{ij} - \sum_{e \in E^-(k)} X_e^{ij} = \begin{cases} +\tau_{ij} & \text{if } k=i \\ -\tau_{ij} & \text{if } k=j, \quad \forall i, j, k \in N, \\ 0 & \text{otherwise} \end{cases} \quad (28)$$

$$\sum_{i,j \in N} x_e^{ij} \leq \mu u_e \forall e \in E, \quad (29)$$

$$\sum_{k \in N} \alpha_k^{ab} = 1 \forall a, b \in N, \quad (30)$$

$$\sum_{i \in N} R_i r(i, a, b) + \sum_{j \in N} C_j c(j, a, b) \leq \tau_{ab} \forall a, b \in N, \quad (31)$$

$$r(a, a, b) + c(b, a, b) \geq \alpha_a^{ab} + \alpha_b^{ab} \forall a, b \in N, \quad (32)$$

$$r(a, a, b) + c(k, a, b) \geq \alpha_b^{ak} \forall k, a, b \in N, \quad (33)$$

$$r(k, a, b) + c(b, a, b) \geq \alpha_a^{kb} \forall k, a, b \in N, \quad (34)$$

$$\alpha_k^{ab} \geq 0 \forall k, a, b \in N, \quad (35)$$

$$x_e^{ij} \geq 0 \forall e \in E, \forall i, j \in N, \quad (36)$$

$$r(i, a, b) + c(i, a, b) \geq 0 \forall i, a, b \in N, \quad (37)$$

wherein:
- N represents the set of nodes in the network;
- E represents the set of links in the network;
- $E^-(i)$ and $E^+(i)$ represent sets of incoming and outgoing edges, respectively, at node i;
- $\mu$ represents maximum-link utilization of any link in the network;
- $x_e^{ij}$ is a flow variable representing a fraction of traffic from a source node i to a destination node j that traverses a link e in the network;
- $u_e$ represents a capacity of link e;
- k represents an intermediate node between nodes i and j;
- l represents each link in set E;
- $R_i$ represents upper bounds on a total amount of traffic entering the network at node i;
- $C_i$ represents upper bounds on a total amount of traffic leaving the network at node j;
- r(k,a,b) and c(k,a,b) are non-negative variables corresponding to constraints in the second linear program;
- $\alpha_k^{ab}$ represents a fraction of traffic originating at node k and destined for node b, which is sent to intermediate node a in phase 1 and is routed to node b in phase 2 of the two-phase routing scheme;
- $\tau_{ab}$ represents a total demand to be statically provisioned from node a to node b.

19. A computer-readable storage medium having stored thereon a plurality of instructions, the plurality of instructions including instructions which, when executed by a processor, cause the processor to implement a method of routing traffic in a network of nodes interconnected by links and having at least one ingress point and at least one egress point, the method comprising:
- solving, using a computer, a polynomial-size linear program derived from a combination of:
  - a first liner program having infinite constraints and adapted to minimize maximum-link utilization of a link in a path between the ingress point and the egress point; and
  - a second linear program adapted to determine whether any constraint of the first linear program is violated;
- implementing, during a first routing phase, based on the solution to the polynomial-size linear problem, a first routing method for routing a fraction of traffic between the at least one ingress point and at least one intermediate node; and
- implementing, during a second routing phase, based on the solution to the polynomial-size linear problem, a second routing method for routing a fraction of traffic between the at least one intermediate node and the at least one egress point.

* * * * *